(12) United States Patent
Muscas et al.

(10) Patent No.: US 9,068,531 B2
(45) Date of Patent: Jun. 30, 2015

(54) ONE-PIECE PISTON WITH IMPROVED COMBUSTION BOWL RIM REGION AND METHOD OF MANUFACTURE

(71) Applicant: Federal-Mogul Corporation, Southfield, MI (US)

(72) Inventors: Florin Muscas, Novi, MI (US); Michael Weinenger, Southfield, MI (US)

(73) Assignee: Federal-Mogul Corporation, Southfield, MI (US)

( * ) Notice: Subject to any disclaimer, the term of this patent is extended or adjusted under 35 U.S.C. 154(b) by 119 days.

(21) Appl. No.: 13/708,656

(22) Filed: Dec. 7, 2012

(65) Prior Publication Data

US 2013/0146017 A1    Jun. 13, 2013

Related U.S. Application Data

(60) Provisional application No. 61/568,213, filed on Dec. 8, 2011.

(51) Int. Cl.
*F02F 3/26* (2006.01)
*F02F 3/16* (2006.01)
(Continued)

(52) U.S. Cl.
CPC ............. *F02F 3/26* (2013.01); *Y10T 29/49249* (2015.01); *B23P 15/10* (2013.01); *F02F 3/003* (2013.01); *F02F 3/22* (2013.01)

(58) Field of Classification Search
CPC .... F02F 3/26; F02F 3/16–3/225; F02F 3/003; B23P 15/10
USPC ........................................................ 123/41.02
See application file for complete search history.

(56) References Cited

U.S. PATENT DOCUMENTS 3,341,924 A    9/1967    Clary
4,667,627 A *  5/1987    Matsui et al. .............. 123/193.6
(Continued)

FOREIGN PATENT DOCUMENTS

DE    1103698    3/1961
DE    1210302    2/1966
(Continued)

OTHER PUBLICATIONS

International Search Report mailed Apr. 5, 2013 (PCT/US2012/068411).

*Primary Examiner* — Lindsay Low
*Assistant Examiner* — Kevin Lathers
(74) *Attorney, Agent, or Firm* — Robert L. Stearns; Dickinson Wright, PLLC

(57) ABSTRACT

A piston for an internal combustion engine and method of construction thereof is provided. The piston includes a piston body having an upper combustion surface with a combustion bowl depending from the upper combustion surface. The piston body has a ring belt region configured for receipt of at least one piston ring adjacent the upper combustion surface. A cooling gallery is configured in radial alignment with the ring belt region. An annular combustion bowl rim region extends between the upper combustion surface and the combustion bowl, and a bonded seam extends from the combustion bowl rim region radially outwardly to the cooling gallery. The bonded seam has material properties exhibiting an enhanced ability to withstand the extreme temperature, pressure, stress and highly corrosive and erosive effects of the combustion gases relative to the surrounding material of the piston body.

22 Claims, 3 Drawing Sheets

(51) Int. Cl.
*B23P 15/10* (2006.01)
*F02F 3/00* (2006.01)
*F02F 3/22* (2006.01)

(56) References Cited

U.S. PATENT DOCUMENTS

| | | | | |
|---|---|---|---|---|
| 5,958,332 | A * | 9/1999 | Hoeg | 420/442 |
| 6,222,150 | B1 * | 4/2001 | Nomura et al. | 219/78.02 |
| 7,104,183 | B2 | 9/2006 | Huang | |
| 7,421,782 | B2 * | 9/2008 | Otaka | 29/888.04 |
| 7,761,987 | B2 | 7/2010 | Mielke | |
| 2004/0086417 | A1 * | 5/2004 | Baumann et al. | 420/531 |
| 2007/0283917 | A1 * | 12/2007 | Lapp et al. | 123/193.6 |
| 2008/0273936 | A1 | 11/2008 | Bernhardt et al. | |
| 2009/0241769 | A1 | 10/2009 | Feeser | |
| 2012/0037115 | A1 | 2/2012 | Schnaiter et al. | |

FOREIGN PATENT DOCUMENTS

| | | |
|---|---|---|
| DE | 102005021428 A1 | 11/2006 |
| DE | 102007044106 A1 | 3/2009 |
| DE | 102008046718 A1 | 4/2009 |
| JP | 2000158119 A | 6/2000 |

* cited by examiner

ONE-PIECE PISTON WITH IMPROVED COMBUSTION BOWL RIM REGION AND METHOD OF MANUFACTURE

CROSS-REFERENCE TO RELATED APPLICATION

This application claims the benefit of U.S. Provisional Application Ser. No. 61/568,213, filed Dec. 8, 2011, which is incorporated herein by reference in its entirety.

BACKGROUND OF THE INVENTION

1. Technical Field

This invention relates generally to pistons for internal combustion engines, and particularly those that are made in one piece and to their methods of manufacture.

2. Related Art

It is known in the art to manufacture pistons for internal combustion engines by fabricating a piston blank (by casting, forging, machining, powder metal techniques, or combinations of these operations) and to form in such pistons at least one cooling gallery that is either closed and which may contain a heat-extracting material, such as sodium, or which gallery is at least partially open to receive a flow of cooling oil for cooling regions of the piston adjacent the galley.

One technique for forming the gallery in such pistons is to form an initially open channel in the piston and then to displace, by forging or rolling techniques, a flange of the piston radially outwardly against an outermost surface of the piston body to enclose the gallery, where the resulting joint, located away from a combustion bowl rim of the piston, may be closed by soldering, brazing or welding. Such a technique is generally shown in prior references DE 1103698, DE 1210302, DE 102005021428, US 2009/0241769, US 2008/0273936, U.S. Pat. No. 7,104,183, U.S. Pat. No. 7,421,782, and U.S. Pat. No. 7,761,987.

For some engine applications, such as high performance engines and diesel engines, the piston is subjected to extreme temperature cycles and highly corrosive and erosive gases. In these engines, the combustion bowl region, and particularly an upper rim region of the combustion bowl, is particularly subjected to extreme temperature, pressure, stress and highly corrosive and erosive gases. Accordingly, the combustion bowl rim region is typically considered a likely region of degradation in use.

A piston constructed in accordance with this invention provides a closed, or substantially closed cooling gallery with a combustion bowl having a combustion bowl rim region that is able to withstand the extreme temperature, pressure, stress and highly corrosive and erosive gases in modern high performance and diesel engines, thereby providing the piston with and increased useful operating life.

SUMMARY OF THE INVENTION

In accordance with one aspect of the invention, a piston for an internal combustion engine is provided. The piston includes a piston body having an upper combustion surface with a combustion bowl depending from the upper combustion surface. The piston body has a ring belt region configured for receipt of at least one piston ring adjacent the upper combustion surface. A cooling gallery is configured in radial alignment with the ring belt region. An annular combustion bowl rim region extends between the upper combustion surface and the combustion bowl, and a bonded seam extends from the combustion bowl rim region radially outwardly to the cooling gallery. The bonded seam has material properties exhibiting an enhanced ability to withstand the extreme temperature, pressure, stress and highly corrosive and erosive effects of the combustion gases relative to the surrounding material of the piston body.

In accordance with another aspect of the invention, the bonded seam has a first portion and a second portion, the first portion being inclined relative to the second portion, thereby strategically locating the first and second portions to enhance the ability of the combustion bowl rim region to withstand the extreme temperature, pressure, stress and highly corrosive and erosive effects of the combustion gases.

In accordance with another aspect of the invention, the first portion is frustroconical and the second portion is planar, thereby strategically locating the first and second portions to enhance the ability of the combustion bowl rim region to withstand the extreme temperature, pressure, stress and highly corrosive and erosive effects of the combustion gases.

In accordance with another aspect of the invention, the first portion diverges from the upper combustion surface radially outwardly toward the cooling gallery, thereby strategically locating the first and second portions to enhance the ability of the combustion bowl rim region to withstand the extreme temperature, pressure, stress and highly corrosive and erosive effects of the combustion gases.

In accordance with another aspect of the invention, the second portion extends from the first portion radially outwardly to the cooling gallery, thereby strategically locating the first and second portions to enhance the ability of the combustion bowl rim region to withstand the extreme temperature, pressure, stress and highly corrosive and erosive effects of the combustion gases.

In accordance with another aspect of the invention, the first portion diverges from the ring belt region radially outwardly toward the upper combustion surface, thereby strategically locating the first and second portions to enhance the ability of the combustion bowl rim region to withstand the extreme temperature, pressure, stress and highly corrosive and erosive effects of the combustion gases.

In accordance with another aspect of the invention, the second portion extends from the first portion radially outwardly to the cooling gallery, thereby strategically locating the first and second portions to enhance the ability of the combustion bowl rim region to withstand the extreme temperature, pressure, stress and highly corrosive and erosive effects of the combustion gases.

In accordance with another aspect of the invention, the piston body extends along a central longitudinal axis and the second portion extends transversely to the central longitudinal axis, thereby strategically locating the second portion to enhance the ability of the combustion bowl rim region to withstand the extreme temperature, pressure, stress and highly corrosive and erosive effects of the combustion gases.

In accordance with another aspect of the invention, the cooling gallery has an upper surface and the second portion extends as a coplanar extension of the upper surface, thereby strategically locating the second portion to enhance the ability of the combustion bowl rim region to withstand the extreme temperature, pressure, stress and highly corrosive and erosive effects of the combustion gases.

In accordance with another aspect of the invention, the first portion extends in an inclined relation to the central longitudinal axis, thereby strategically locating the first portion to enhance the ability of the combustion bowl rim region to withstand the extreme temperature, pressure, stress and highly corrosive and erosive effects of the combustion gases.

In accordance with another aspect of the invention, a braze material is disposed in the bonded seam, wherein the braze material has an increased ability to withstand the extreme temperature, pressure, stress and highly corrosive and erosive gases relative to the material forming the piston body.

In accordance with yet another aspect of the invention, a method of constructing a piston for an internal combustion engine is provided. The method includes the following: providing a piston body having an annular inner wall and an annular outer wall extending concentrically relative with one another along a common central longitudinal axis to respective free ends; displacing an annular portion of the annular outer wall radially inwardly to bring a portion of the annular outer wall into overlying relation with the free end of the annular inner wall; and forming a bonded seam between the free end of the annular inner wall and the overlying annular portion of the outer wall so that the bonded seam extends from the combustion bowl rim region radially outwardly to a cooling gallery.

In accordance with another aspect of the invention, the method can include forming the bonded seam extending along a first portion and a second portion with the first portion being inclined relative to the second portion, thereby strategically locating the first and second portions to enhance the ability of the combustion bowl rim region to withstand the extreme temperature, pressure, stress and highly corrosive and erosive effects of the combustion gases.

In accordance with another aspect of the invention, the method can include forming the first portion being frustroconical and the second portion being planar, thereby strategically locating the first and second portions to enhance the ability of the combustion bowl rim region to withstand the extreme temperature, pressure, stress and highly corrosive and erosive effects of the combustion gases.

In accordance with another aspect of the invention, the method can include forming the first portion diverging from the upper combustion surface radially outwardly toward the cooling gallery, thereby strategically locating the first portion to enhance the ability of the combustion bowl rim region to withstand the extreme temperature, pressure, stress and highly corrosive and erosive effects of the combustion gases.

In accordance with another aspect of the invention, the method can include forming the second portion extending from the first portion radially outwardly to the cooling gallery, thereby strategically locating the first and second portions to enhance the ability of the combustion bowl rim region to withstand the extreme temperature, pressure, stress and highly corrosive and erosive effects of the combustion gases.

In accordance with another aspect of the invention, the method can include forming the first portion diverging from the ring belt region radially outwardly toward the upper combustion surface, thereby strategically locating the first portion to enhance the ability of the combustion bowl rim region to withstand the extreme temperature, pressure, stress and highly corrosive and erosive effects of the combustion gases.

In accordance with another aspect of the invention, the method can include forming the second portion extending from the first portion radially outwardly to the cooling gallery, thereby strategically locating the first and second portions to enhance the ability of the combustion bowl rim region to withstand the extreme temperature, pressure, stress and highly corrosive and erosive effects of the combustion gases.

In accordance with another aspect of the invention, the method can include forming the second portion extending transversely to the central longitudinal axis, thereby strategically locating the second portion to enhance the ability of the combustion bowl rim region to withstand the extreme temperature, pressure, stress and highly corrosive and erosive effects of the combustion gases.

In accordance with another aspect of the invention, the method can include forming the cooling gallery having an upper surface and the second portion extending as a coplanar extension of the upper surface, thereby strategically locating the second portion to enhance the ability of the combustion bowl rim region to withstand the extreme temperature, pressure, stress and highly corrosive and erosive effects of the combustion gases.

In accordance with another aspect of the invention, the method can include forming the first portion extending in inclined relation to the central longitudinal axis, thereby strategically locating the first portion to enhance the ability of the combustion bowl rim region to withstand the extreme temperature, pressure, stress and highly corrosive and erosive effects of the combustion gases.

In accordance with another aspect of the invention, the method can include forming the bonded seam in a brazing process with a braze material having enhanced properties to withstand high temperatures relative to the piston body.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
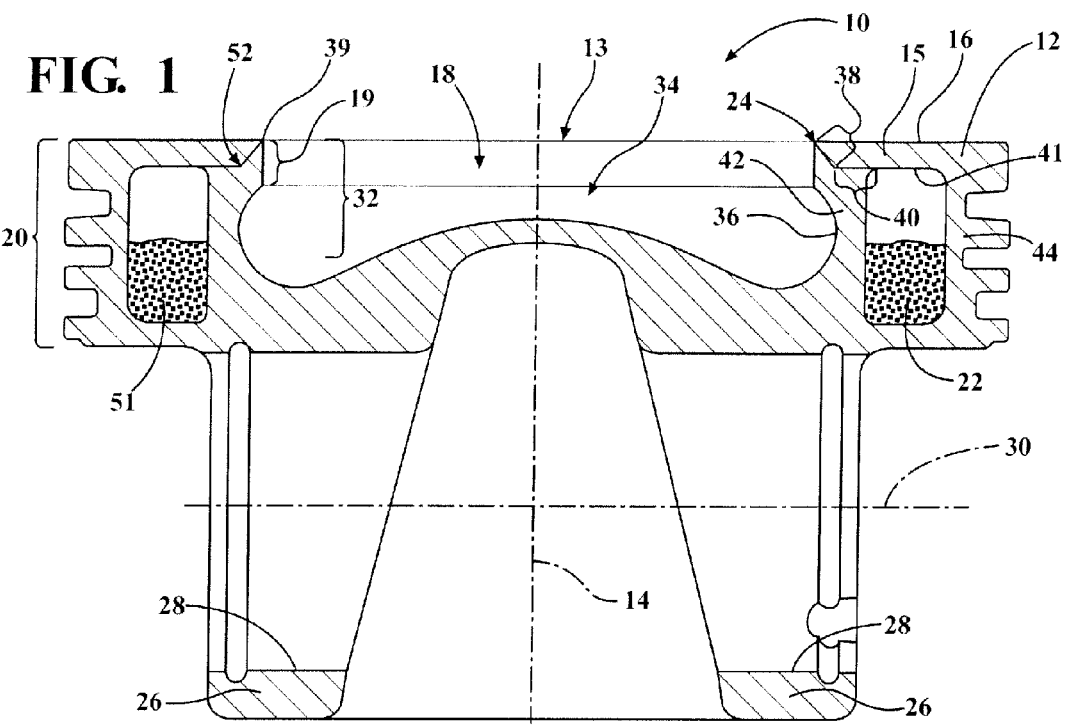
FIG. 1 is a cross-sectional view taken generally along a pin bore axis of a piston constructed in accordance with one aspect of the invention.

Referring in more detail to the drawings, FIG. 1 illustrates a piston 10 constructed in accordance with one aspect of the invention. The piston 10 is configured for reciprocating movement in a cylinder bore or chamber of an internal combustion engine (not shown), such as light vehicle diesel, mid-range diesel, heavy duty and large bore diesel engines, and modern high performance gas engines, for example. The piston 10 has a piston body 12 constructed as a single, monolithic piece of material extending along a central longitudinal axis 14 along which the piston 10 reciprocates in the cylinder bore. The body 12 is formed including an upper combustion wall 13 having an upper wall portion 15 providing a planar or substantially planar upper combustion surface 16 with a combustion bowl 18 depending from and being bounded by an annular combustion bowl rim region 19 adjacent the upper combustion surface 16, wherein the combustion bowl rim region 19 extends between the upper combustion surface 16 and the combustion bowl 18. The upper combustion surface 16, combustion bowl 18 and combustion bowl rim region 19 are configured for direct exposure to extreme temperature, pressure, stress and combustion gases within the cylinder bore, wherein the combustion bowl rim region 19 typically experiences the greatest temperatures. The piston body 12 is constructed having an outer ring belt region 20 configured for receipt of at least one piston ring (not shown) adjacent the upper combustion surface 16 with a closed or substantially closed toroid-shaped cooling gallery 22 being configured radially inwardly and in radial alignment with the ring belt region 20. A bonded joint, also referred to as bonded seam 24, extends from the combustion bowl rim region 19 radially outwardly to the cooling gallery 22. The bonded seam 24 provides material, forming at least a portion of the combustion bowl rim region 19 that is exposed to the most extreme temperature combustion gases, with material properties having an increased ability to conduct heat and withstand the extreme temperature, pressure, stress, and corrosive/erosive affects imparted by the combustion gases relative to adjacent material of the piston body 12. Accordingly, the combustion bowl rim region 19 is able to withstand the most severe operating conditions, i.e. temperature, pressure, and chemical attack, thereby providing the piston 10 with an ability to attain an extended useful life in comparison with a piston not having a combustion bowl rim region with enhanced material properties.

The piston body 12 has a pair of pin bosses 26 depending generally from a wall of the combustion bowl 18 to provide laterally spaced pin bores 28 coaxially aligned along a pin bore axis 30 that extends generally transverse to the central longitudinal axis 14. The pin bores 28 are configured for receipt of a wrist pin (not shown) therein to facilitate coupling the piston 10 to a connecting rod (not shown).

The combustion bowl 18 is recessed from the upper combustion surface 16. The combustion bowl 18 is configured having a desired geometry to provide a desired gas flow with the cylinder bore. The combustion bowl 18 is formed in part by an upstanding annular inner wall portion 32 and a base portion, also referred to lower combustion wall or floor 34. The annular inner wall portion 32 extends from the combustion bowl rim region 19 to the floor 34. In its finished state, the annular inner wall portion 32 can be formed having a recessed annular channel 36 that extends radially outwardly beneath the combustion bowl rim region 19 and beneath a portion of the upper combustion surface 16. An upper surface of the floor 34 that is directly exposed to combustion gases can be formed having a convex, dome-shaped configuration, both of which are configured to provide the desired fluid flow dynamics of combustion gases within the cylinder bore. It should be recognized that these surfaces 32, 34 can be formed having any suitable geometry, depending on the fluid flow dynamics desired.

The annular inner wall portion 32 of the combustion bowl 18 is fixed to the upper wall portion 15 of the upper combustion wall 13 via the bonded seam 24. The bonded seam 24 is preferably formed via any desired brazing process, any desired welding process, e.g. laser welding, or via any suitable adhesive/glue. If brazed, the braze material is selected from materials that have material properties with an increased ability to withstand the extreme temperature, pressure, stress and highly corrosive and erosive effects of combustion gases relative to the material of the piston body 12. Otherwise, if welded, the welding process provides a heat affected region of heat-hardened material extending outwardly from the bonded seam 24, throughout or substantially throughout the entire combustion bowl rim region 19. The heat-hardened material resulting from the process used to form the bonded seam 24 attains material properties with an increased ability to withstand the extreme temperature, pressure, stress and highly corrosive and erosive affects of combustion gases relative to the surrounding material of the piston body 12. In addition to providing enhanced material properties to the region immediately adjacent the bonded seam 24, the bonded seam 24 provides a fluid and gas-tight bonded seal between the annular inner wall portion 32 and the upper wall portion 15 of the upper combustion wall 13.

The bonded seam 24, in accordance with one aspect of the invention, by way of example and without limitation, extends along a first portion 38 and a second portion 40 of an annular inner wall 42. The first portion 38 and second portion 40 are inclined relative to one another. The first portion 38 is formed having a frustroconical configuration that is inclined relative to the central longitudinal axis 14. The frustroconical first portion 38 diverges from the upper combustion surface 16, from an uppermost corner 39 of the combustion bowl rim region 19, radially outwardly and downwardly toward the cooling gallery 22. This embodiment is particularly well suited where the hottest location of the combustion bowl rim region 19 is immediately adjacent the upper combustion surface 16 in the region of the uppermost corner 39. The second portion 40 is shown as being planar. The planar second portion 40 extends radially outwardly from the frustroconical first portion 38 in transverse relation to the central longitudinal axis 14 and in generally parallel relation to the pin bore axis 30 to the cooling gallery 22. The second portion 40 is formed as a coplanar extension of an upper surface 41 of an upper wall of the cooling gallery 22. With the bonded seam 24 extending to the uppermost corner 39 of the combustion bowl rim region 19, the combustion bowl rim region 19, which ordinarily is considered an area prone to earliest degradation from the extreme temperature, pressure, and affects from the combustion gases, is increased in strength and resistance to degradation. The resistance to degradation results from the enhanced material properties of the material forming and surrounding the bonded seam 24, whether due to heat treatment via welding, e.g. laser welding, or to the material used in a brazing or other adhering process.

Figure 3:
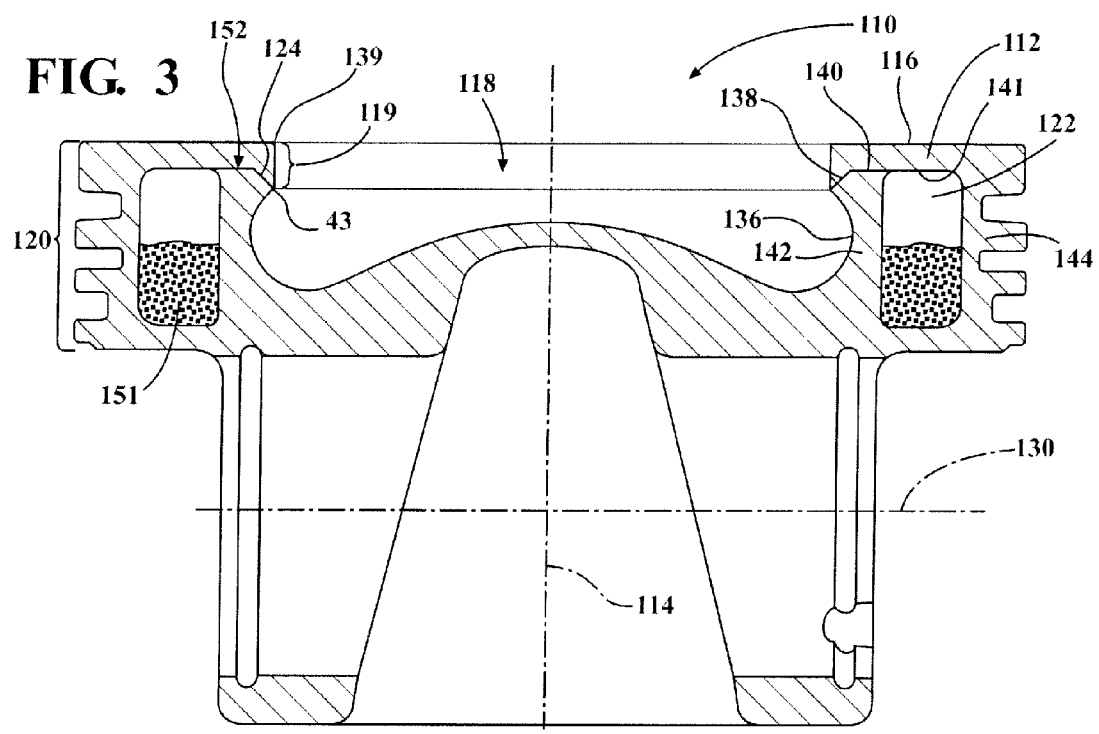
FIG. 3 is a view similar to FIG. 1 of a piston constructed in accordance with another aspect of the invention.

FIG. 3 shows a piston 110 constructed in accordance with another aspect of the invention, wherein the same reference numerals, offset by a factor of 100, are used to identify like features as described above. The piston 110 in includes a piston body 112 that is configured generally the same as the piston 10 discussed above, however, the bonded seam 124 is configured differently than that described above to account for an axial shift in the location of the highest temperature location within the combustion bowl rim region 119. Instead of the highest temperature region being located at an uppermost corner 139 of the combustion bowl rim region 119, as in the previous embodiment, the highest temperature region is shifted axially downwardly to a lowermost corner 43 of the combustion bowl rim region 119. Accordingly, the bonded seam 124 takes on a location and configuration to account for this axial shift of the highest temperature region.

The bonded seam 124 is shown as extending along a frustroconical first portion 138 of an annular inner wall 142. The first portion 138 is inclined relative to a longitudinal axis 114 and a planar or substantially planar second portion 140 that extends radially outwardly from the first portion 138 and generally parallel to a pin bore axis 130 to a closed or substantially closed cooling gallery 122. Accordingly, the first and second portions 138, 140 are inclined relative to one another. However, rather than the first portion 138, corresponding to a first portion of the bonded seam 124, diverging downwardly and radially outwardly from an uppermost corner 139 of the combustion bowl rim region 119, the first portion 138 diverges upwardly and radially outwardly from the lowermost corner 43 of the combustion bowl rim region 119 toward the upper combustion surface 116. The second portion 140 extends as a coplanar extension of an upper surface 141 of an upper wall of the cooling gallery 122. This embodiment is particularly well suited where the hottest location of the combustion bowl rim region 119 is shifted axially downwardly from the upper combustion surface 116 to a location immediately adjacent an annular recessed channel 136.

Figure 5:
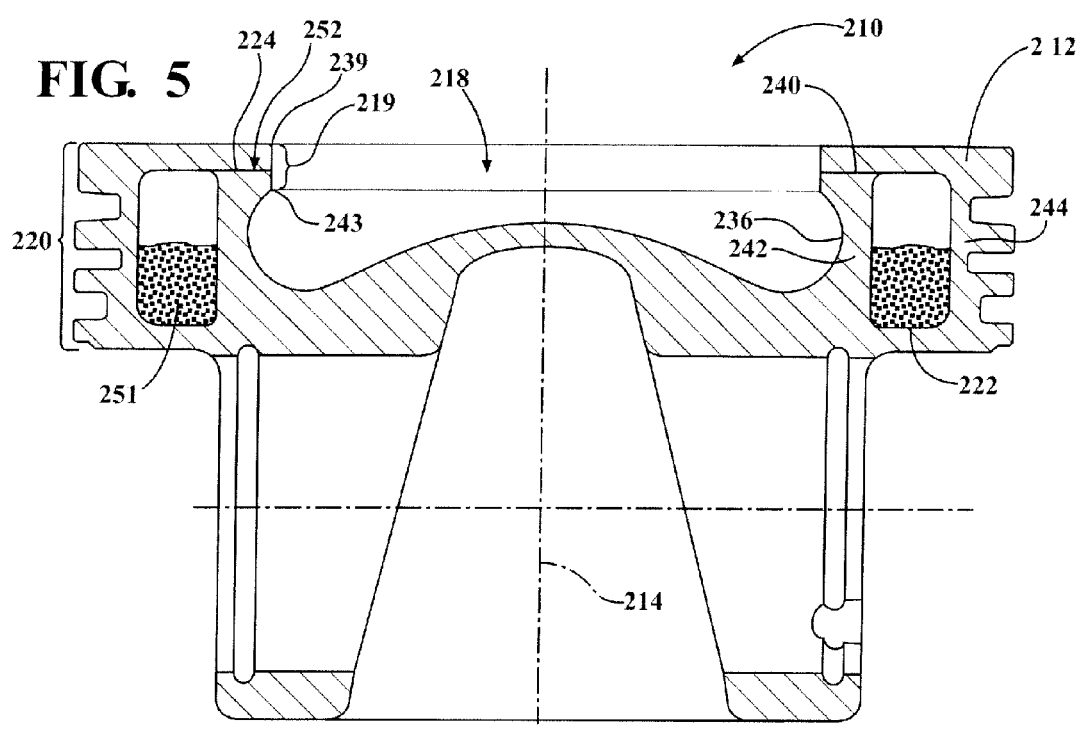
FIG. 5 is a view similar to FIG. 1 of a piston constructed in accordance with yet another aspect of the invention.

FIG. 5 shows a piston 210 constructed in accordance with another aspect of the invention, wherein the same reference numerals, offset by a factor of 200, are used to identify like features as described above. The piston 210 includes a piston body 212 that is configured generally the same as the piston 10 discussed above, however, the bonded seam 224 is configured differently to account for an axial shift in the location of the highest temperature location within a combustion bowl rim region 219.

The bonded seam 224, rather than extending along a frustroconical first portion as in the embodiments discussed above, extends along an entirely planar portion 240 that extends from the combustion bowl rim region 219 to a closed or substantially closed cooling gallery 222. As such, rather than having a portion diverging radially outwardly from one of an uppermost corner 239 or a lowermost corner 243 of the combustion bowl rim region 219, the bonded seam 224 extends laterally, in generally transverse relation to a longitudinal axis 214 of the piston 210. The bonded seam 224 is shown as being spaced in equidistant or substantially equidistant relation between the uppermost and lowermost corners 239, 243. Accordingly, the enhanced material properties resulting from the process used to form the bonded seam 224 extend across the full width of the combustion bowl rim region 219.

Figure 2:
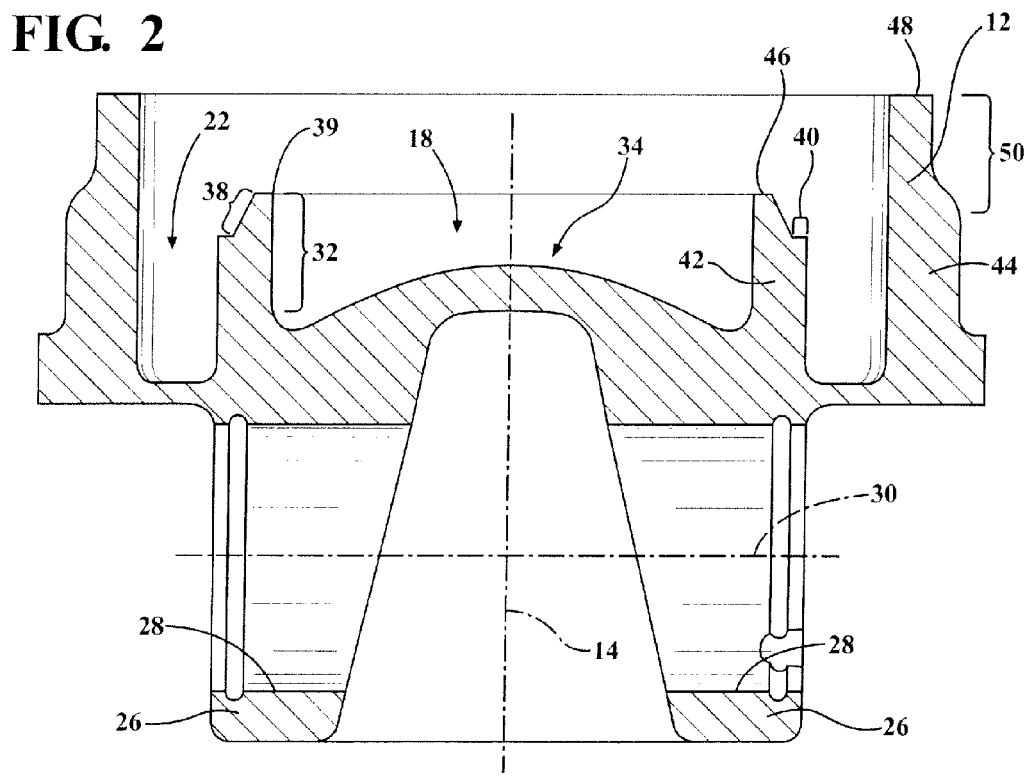
FIG. 2 is a cross-sectional view taken generally along the pin bore axis of the piston of FIG. 1 showing the piston in a partially constructed state.
Figure 4:
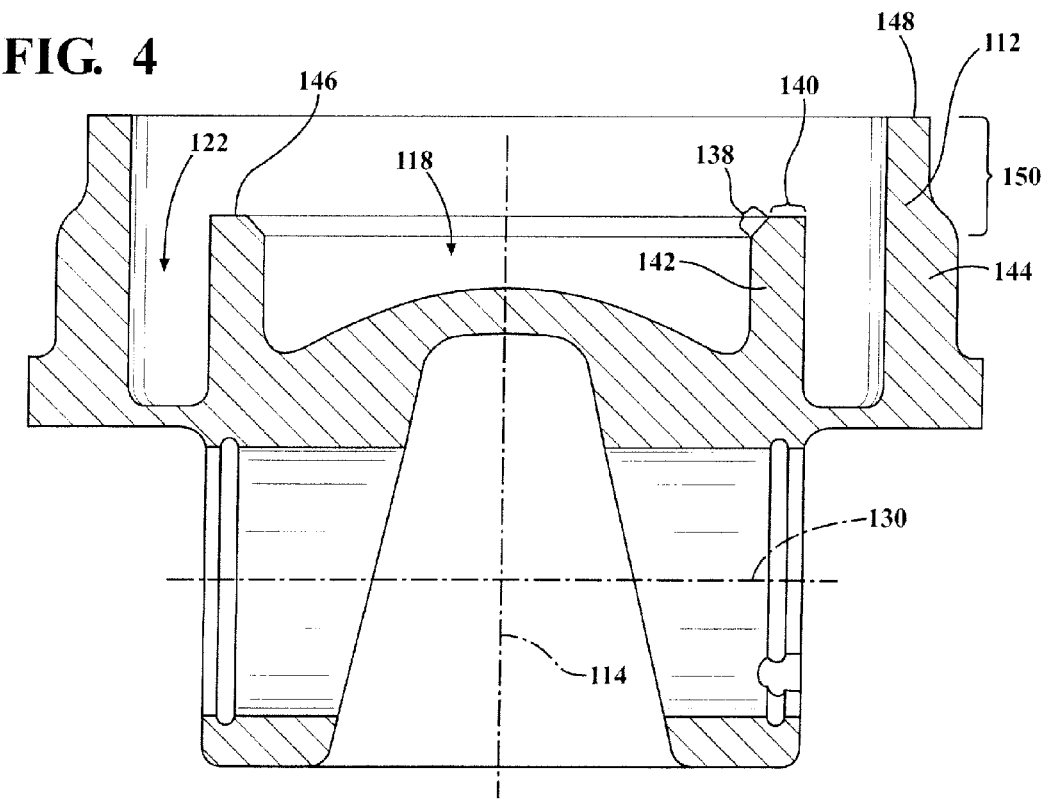
FIG. 4 is a cross-sectional view taken generally along the pin bore axis of the piston of FIG. 2 showing the piston in a partially constructed state.
Figure 6:
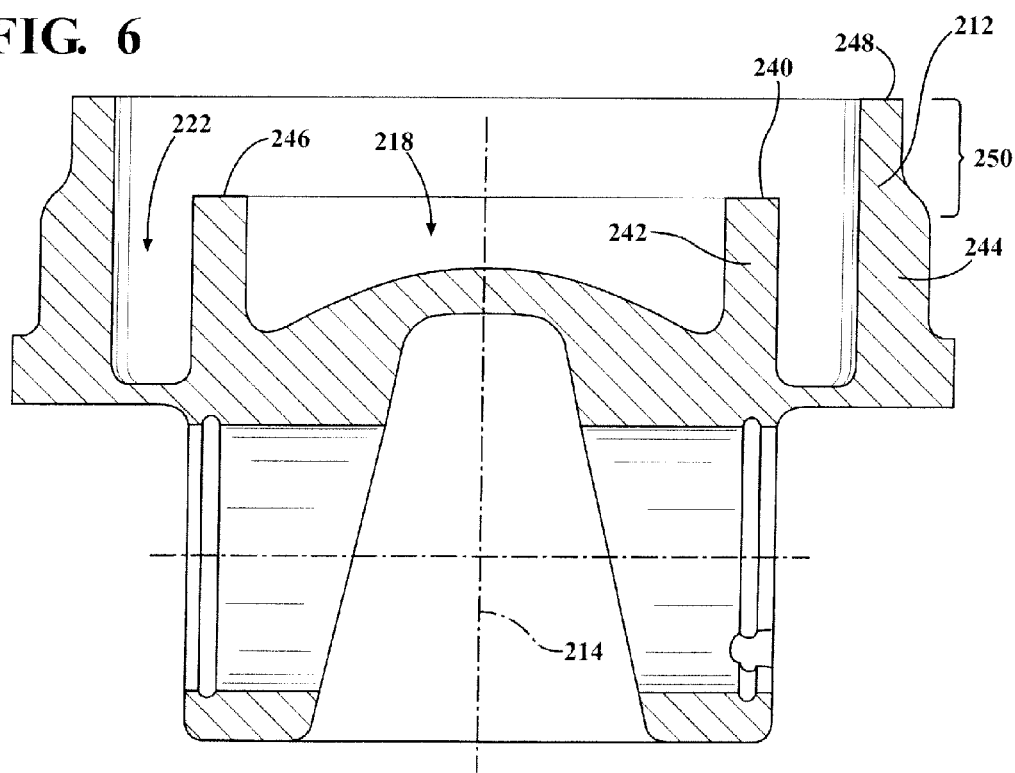
FIG. 6 is a cross-sectional view taken generally along the pin bore axis of the piston of FIG. 5 showing the piston in a partially constructed state.

In accordance with another aspect of the invention, a method of constructing a piston 10, 110, 210, as described above and illustrated in FIGS. 1, 3 and 5, is provided. The method includes providing or forming a piston body 12, 112, 212 from a single piece of material, such as steel. The forming process can be performed using a forging or machining process to provide the partially constructed body, such as shown in FIGS. 2, 4 and 6, by way of example and without limitation. By way of example, a combustion bowl 18, 118, 218 is partially formed along with an outer cooling gallery 22, 122, 222. Upon forming the body 12, 112, 212, an annular inner wall 42, 142, 242 and an annular outer wall 44, 144, 244 remain upstanding such that they extend axially along a central longitudinal axis 14, 114, 214 and concentrically with one another about the longitudinal axis 14, 114, 214 to a respective inner free end 46, 146, 246 and a respective outer free end 48, 148, 248. The free end 46, 146 of the inner wall 44, 144 can be configured as shown FIGS. 2 and 4 having a frustroconical first portion 38, 138 that is inclined relative to the longitudinal axis 14, 114 and a planar second portion 40, 140 that extends from the first portion 38, 138 radially outwardly and generally parallel to the pin bore axis 30, 130. Otherwise, as shown in FIG. 6, the free end 246 of the inner wall 242 can be formed having a planar portion 240 that extends across the entirety of the free end 246 without including a frustroconical portion.

Upon forming or providing the partially constructed body 12, 112, 212, further processing includes displacing a portion 50, 150, 250 of the outer wall 44, 144, 244 to extend radially inwardly such that the free end 48, 148, 248 of the outer wall 44, 144, 244 faces radially inwardly and an end portion of the outer wall 44, 144, 244 is brought into an axially aligned, overlying relation with the free end 46, 146, 246 of the inner wall 42, 142, 242, such that the overlying portion of the outer wall 44, 144, 244 is brought into abutment or close proximity with the free end 46, 146, 246 of the inner wall 42, 142, 242. The displacing process can be performed via any suitable displacing process, including, by way of example and without limitation, crimping/bending or rolling processes. If the cooling gallery 22, 122, 222 is intended to be a completely sealed cooling gallery, prior to performing the displacing process, a coolant medium 51, 151, 251 can be disposed in the channel between the inner wall 42, 142, 242 and the outer wall 44, 144, 244, such that upon completing the displacing process and subsequent bonding process discussed below, the coolant medium 51, 151, 251 is sealed within the cooling gallery 22, 122, 222. The coolant medium 51, 151, 251 can be provided as any suitable coolant medium, such as a metal-containing coolant composition, including solid, liquid, or a mixture of solid particles and liquid.

Then, upon displacing the portion of the outer wall 44, 144, 244, a seam 24, 124, 224 extending along the first and second portions 38, 40, 138, 140 (only portion 240 with regard to the seam 224) and the outer wall 44, 144, 244 is bonded and sealed. The bonding is preferably performed via any suitable brazing process using a braze material 52, 152, 252 that both bonds and seals the seam 24, 124, 224, while at the same time providing an outer surface layer of the braze material that has material properties with an enhanced ability to withstand the extreme temperature, pressure, stress, and corrosive/erosive affects imparted by the combustion gases than the base material of the piston body 12, 112, 212. As such, the bonded seam 24, 124, 224 of the combustion bowl rim region 19, 119, 219 includes an outer layer of the braze material 50, 150, 250, while also imparting a heat affected zone immediately adjacent the bonded seam 24, 124, 224, thereby improving the wear and performance characteristics of the combustion bowl rim region 19, 119, 219 in use. Of course, as discussed above, other processes can be utilized to form the bonded seam 24, 124, 224, such as welding, which provides the aforementioned heat affected zone, or adhesives/glues, for example. Depending on the embodiment, the combustion bowl rim 19, 119, 219 can be formed entirely or substantially by the annular inner wall 42 (FIG. 1); entirely or substantially by the annular outer wall 144 (FIG. 3); or a combination of the annular inner wall 242 and the annular outer wall 244 (FIG. 5).

Upon forming the bonded seam 24, 124, 224, further processing of the piston body 12, 112, 212 can be performed, including, by way of example and without limitation, machining the inner wall 42, 142, 242 to form a finished surface of the combustion bowl rim region 19, 119, 219 along with the recessed annular channel 36, 136, 236 and machining the outer wall 44, 144, 244, particularly with the outer ring belt region 20, 120, 220, to form the desired ring grooves.

Obviously, many modifications and variations of the present invention are possible in light of the above teachings. It is, therefore, to be understood that within the scope of the appended claims, the invention may be practiced otherwise than as specifically described.

What is claimed is:
1. A piston for an internal combustion engine, comprising:
a piston body formed as a single, monolithic piece of material having an annular inner wall and an annular outer wall extending concentrically relative with one another along a common central longitudinal axis, said annular outer wall having a wall surface which is parallel to said central longitudinal axis and having a portion in longitudinal overlying axial alignment, with respect to said central longitudinal axis, with an upper wall surface of said annular inner wall, said body having an upper combustion surface with a combustion bowl depending from the upper combustion surface;

said piston body further including a ring belt region formed in said annular outer wall, said ring belt region being configured for receipt of at least one piston ring adjacent said upper combustion surface;

said piston body further including a cooling gallery configured in radial alignment with the ring belt region;

said piston body further including an annular combustion bowl rim region extending between said upper combustion surface and said combustion bowl; and a bonded seam extending from said combustion bowl rim region radially outwardly to said cooling gallery, said bonded seam having material properties with an enhanced ability to withstand the extreme temperature, pressure, stress and highly corrosive and erosive effects of the combustion gases relative to the surrounding material of said piston body.

2. The piston of claim 1 wherein said bonded seam extends along a first portion and a second portion, said first portion being inclined relative to said second portion.

3. The piston of claim 2 wherein said first portion is frustroconical and said second portion is planar.

4. The piston of claim 3 wherein said first portion diverges from said upper combustion surface radially outwardly toward said cooling gallery.

5. The piston of claim 4 wherein said second portion extends from said first portion radially outwardly to said cooling gallery.

6. The piston of claim 3 wherein said first portion diverges from said annular combustion bowl rim region radially outwardly toward said upper combustion surface.

7. The piston of claim 6 wherein said second portion extends from said first portion radially outwardly to said cooling gallery.

8. The piston of claim 2 wherein said piston body extends along a central longitudinal axis and said second portion extends transversely to said central longitudinal axis.

9. The piston of claim 8 wherein said cooling gallery has an upper surface and said second portion extends as a coplanar extension of said upper surface.

10. The piston of claim 8 wherein said first portion extends in inclined relation to said central longitudinal axis.

11. The piston of claim 1 further including a braze material disposed in said bonded seam, said braze material having enhanced properties to withstand high temperatures relative to said piston body.

12. A method of constructing a piston for an internal combustion engine, comprising:

providing a piston body having an annular inner wall and an annular outer wall extending concentrically relative with one another along a common central longitudinal axis to respective uppermost free ends;

displacing an annular portion of the annular outer wall radially inwardly to bring a portion of the annular outer wall into axially aligned, with respect to said central longitudinal axis, overlying relation with the uppermost free end of the annular inner wall, wherein said annular outer wall has a wall surface which is parallel to said central longitudinal axis and is in longitudinal axial alignment with an inner wall surface of said annular inner wall; and forming a bonded seam between the free end of the annular inner wall and the overlying annular portion of the outer wall so that the bonded seam extends from the combustion bowl rim region radially outwardly to a cooling gallery.

13. The method of claim 12 further including forming the bonded seam extending along a first portion and a second portion with the first portion being inclined relative to the second portion.

14. The method of claim 13 further including forming the first portion being frustroconical and the second portion being planar.

15. The method of claim 14 further including forming the first portion diverging from the upper combustion surface radially outwardly toward the cooling gallery.

16. The method of claim 15 further including forming the second portion extending from the first portion radially outwardly to the cooling gallery.

17. The method of claim 14 further including forming the first portion diverging from the annular combustion bowl rim region radially outwardly toward the upper combustion surface.

18. The method of claim 17 further including forming the second portion extending from the first portion radially outwardly to the cooling gallery.

19. The method of claim 13 further including forming the second portion extending transversely to the central longitudinal axis.

20. The method of claim 19 further including forming the cooling gallery having an upper surface and the second portion extending as a coplanar extension of the upper surface.

21. The method of claim 19 further including forming the first portion extending in inclined relation to the central longitudinal axis.

22. The method of claim 12 further including forming the bonded seam in a brazing process with a braze material having enhanced properties to withstand high temperatures relative to the piston body.

* * * * *